H. L. BALDWIN.
Curry Comb.

No. 32,505.

Patented June 11, 1861.

witnesses
J. O. Coombs
R. S. Spencer

Inventor
H. L. Baldwin
per Munn & Co
Attorneys.

UNITED STATES PATENT OFFICE.

H. L. BALDWIN, OF BRANFORD, CONNECTICUT.

CURRYCOMB.

Specification of Letters Patent No. 32,505, dated June 11, 1861.

*To all whom it may concern:*

Be it known that I, H. L. BALDWIN, of Branford, in the county of New Haven and State of Connecticut, have invented a new and Improved Currycomb; and I do hereby declare that the following is a full, clear, and exact description of the same, reference being had to the annexed drawings, making a part of this specification, in which—

Figure 1:
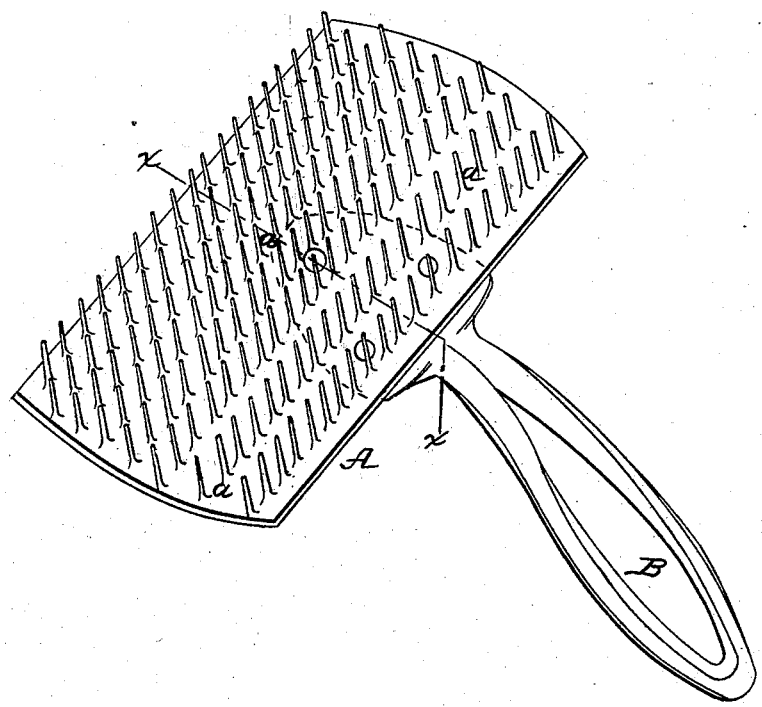
Figure 2:

Figure 1 is a perspective view of my invention, showing the face or toothed side. Fig. 2 a section of the same taken in the line $x$, $x$, Fig. 1.

Similar letters of reference indicate corresponding parts in the two figures.

This invention consists in casting the plate or back of the curry comb and the teeth in one piece substantially as hereinafter described, whereby an implement is obtained which possesses many advantages over those manufactured in the ordinary way.

The ordinary curry combs are formed by having teeth cut in the edges of sheet metal plates, the plates being secured to a proper back plate and bent so as to project from the back plate at right angles. The teeth thus formed are of V-shape and being produced by dies, have sharp edges and corners which when the implement is new, greatly irritate the skin of the animal, so much so that the implement is required to be used very sparingly on some animals, while others will not admit of its being used at all. The latter, when worn so as to be free from this objection are very inefficient in their operation as they become very blunt and scarcely operate at all in removing the dirt from the skin and hair of the animal.

In my improvement the teeth are cast in cylindrical form and of about an equal thickness throughout so that they will perform their work efficiently until completely worn out, and without irritating the skin of the animal as they act as mildly as the teeth of a "card" while operating as thoroughly as the teeth of any ordinary curry comb in good order.

In the annexed drawings A. represents the back plate of the curry comb which may be of rectangular form, or have parallel sides with rounded ends as shown clearly in Fig. 1. The form of the back plate is not material although the rectangular, or an approximate form, would probably be preferable.

The plate A. is cast with teeth $a$, said teeth being cylindrical and of about an equal thickness their entire length. The teeth $a$, may be arranged in rows as shown clearly in Fig. 1, and the ends of the teeth should be of rounded form in order to prevent them irritating the animal.

The handle B. of the implement may also be of cast metal secured to the plate A. by rivets. A wooden handle however may be used if desired.

From the above description it will be seen that the efficiency of the teeth will not be affected by wear, for they will operate in the same way until completely worn out, and having no angles or corners at any part of them the skin of the animal cannot be irritated by them. The implement is also far more durable than the ordinary kinds and the teeth when in use are not so liable to clog or choke up with filth.

Ordinary gray iron may be used, or malleable cast iron, the latter would of course be preferable although more expensive. The implement however may be afforded at a moderate cost even when made of the latter named material.

Having thus described my invention what I claim as new and desire to secure by Letters Patent; is,

The within described curry comb as a new article of manufacture, having its back plate A. and teeth $a$, cast in one piece, the teeth being of cylindrical or an approximate form, and about of an equal thickness throughout their length as and for the purpose specified.

H. L. BALDWIN.

Witnesses:
F. M. JONES,
JUDSON H. BALDWIN.